US011061142B2

(12) United States Patent
Prunean

(10) Patent No.: US 11,061,142 B2
(45) Date of Patent: Jul. 13, 2021

(54) DETERMINING IONOSPHERIC TIME DELAYS FOR GLOBAL POSITIONING SYSTEM (GPS) RECEIVERS USING MULTIPLE CARRIER FREQUENCIES

(71) Applicant: THE BOEING COMPANY, Chicago, IL (US)

(72) Inventor: Cornel Prunean, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 1697 days.

(21) Appl. No.: 13/904,711

(22) Filed: May 29, 2013

(65) Prior Publication Data

US 2014/0354474 A1    Dec. 4, 2014

(51) Int. Cl.
   *G01S 19/13* (2010.01)
   *G01S 19/07* (2010.01)
   *G01S 19/40* (2010.01)

(52) U.S. Cl.
   CPC .............. *G01S 19/13* (2013.01); *G01S 19/07* (2013.01); *G01S 19/074* (2019.08); *G01S 19/40* (2013.01)

(58) Field of Classification Search
   CPC .......... G01S 19/07; G01S 19/24; G01S 19/40; G01S 7/2925; G01S 19/04; G01S 19/43–44; H04S 5/00; H03L 7/1976
   See application file for complete search history.

(56) References Cited

U.S. PATENT DOCUMENTS 3,487,408 A * 12/1969 Clarke ................... G01S 7/2925
                                                          342/139
4,463,357 A *  7/1984 MacDoran .............. G01S 3/023
                                                          342/352

(Continued)

FOREIGN PATENT DOCUMENTS

JP         2008249649 A      10/2008

OTHER PUBLICATIONS

J.A. Klobuchar, Ionospheric Effects on GPS, in B.W. Parkinson et al., Global Positioning System: Theory and Applications, vol. 1; Progress in Astronautics and Aeronautics, vol. 163, American Institute of Aeronautics and Astronautics, Inc., p. 485-498, 1996.*

(Continued)

*Primary Examiner* — Bernarr E Gregory
*Assistant Examiner* — Fred H Mull
(74) *Attorney, Agent, or Firm* — Haynes and Boone, LLP

(57) ABSTRACT

The disclosed method for determining atmospheric time delays involves receiving at least two signals, where the signals each have a different carrier frequency. The method further involves amplifying each of the signals with a respective amplifier for each of the signals to produce amplified signals. Also, the method involves digitizing each of the amplified signals with a respective analog to digital converter (ADC) for each of the amplified signals to produce digital signals. In addition, the method involves correlating each of the digital signals with a code using a respective correlator for each of the digital signals to determine the time group delay differential between the signals. Further, the method involves calculating, with at least one processor, the time group delay coefficient of the signals by using the time group delay differential. The time group delay coefficient is used to correct for the atmospheric time delays in the signals.

20 Claims, 7 Drawing Sheets

(56) References Cited

U.S. PATENT DOCUMENTS

| | | | |
|---|---|---|---|
| 4,894,662 A | | 1/1990 | Counselman |
| 5,235,646 A | * | 8/1993 | Wilde .................... H04S 5/00 381/17 |
| 5,469,470 A | * | 11/1995 | Takahashi ............ H04B 1/7073 375/142 |
| 5,535,278 A | * | 7/1996 | Cahn ...................... G01S 19/24 342/357.69 |
| 5,663,733 A | * | 9/1997 | Lennen ................. G01S 19/215 342/352 |
| 5,903,654 A | * | 5/1999 | Milton .................... G01S 19/32 342/352 |
| 5,944,770 A | | 8/1999 | Enge et al. |
| 6,768,767 B1 | * | 7/2004 | Miyahara ................ G01S 19/30 375/130 |
| 9,071,342 B1 | * | 6/2015 | Jin ......................... G01S 19/30 |
| 2007/0008216 A1 | * | 1/2007 | Ganguly ................ G01S 19/32 342/357.62 |
| 2010/0171535 A1 | * | 7/2010 | Shanan ................. H03L 7/1976 327/157 |
| 2011/0205116 A1 | * | 8/2011 | Fujisawa ................ G01S 19/32 342/357.77 |

OTHER PUBLICATIONS

Microprocessor. (2003). Webster's New World Computer Dictionary. Boston, MA: Houghton Mifflin Harcourt. Retrieved from http://search.credoreference.com/content/entry/webstercom/microprocessor/0.*

A. Batchelor et al., Ionospheric Delay Estimation in the European Global Navigation Overlay Service, IEE Colloquium on Remote Sensing of the Propagation Environment, p. 3/1-3/6, 1996.*

D.M. Akos et al., Design and Implementation of a Direct Digitization GPS Receiver Front End, IEEE Transactions on Microwave Theory and Techniques, vol. 44(12), p. 2334-2339, Dec. 1996 (Year: 1996).*

Entry for the word "carrier." (1999). Focal Dictionary of Telecommunications, Focal Press. London, UK: Routledge. Retrieved from http://search.credoreference.com/content/entry/bhfidt/carrier/0 (Year: 1999).*

Entry for the term "carrier frequency." (1999). Focal Dictionary of Telecommunications, Focal Press. London, UK: Routledge. Retrieved from http://search.credoreference.com/content/entry/bhfidt/carrier_frequency/0 (Year: 1999).*

Entry for the term "carrier wave." (1999). Focal Dictionary of Telecommunications, Focal Press. London, UK: Routledge. Retrieved from http://search.credoreference.com/content/entry/bhfidt/carrier_wave/0 (Year: 1999).*

A.J. van Dierendonck, GPS Receivers, in R.W. Parkinson et al., Global Positioning System: Theory and Applications, vol. 1; Progress in Astronautics and Aeronautics, vol. 163, American Institute of Aeronautics and Astronautics, Inc., p. 329-407, 1996 (Year: 1996).*

L. Breems et al., Continuous-Time Sigma-Delta Modulation for A/D Conversion in Radio Receivers, Kluwer Academic Publishers, p. 9-27, 2001 (Year: 2001).*

Block. (1992). In C. G. Morris (Ed.), Academic Press Dictionary of Science and Technology (4th ed.). Oxford, UK: Elsevier Science & Technology. Retrieved from https://search.credoreference.com/content/entry/apdst/block/1 (Year: 1992).*

Typically. (2013). American Heritage Roget's Thesaurus. Boston, MA: Houghton Mifflin. Retrieved from https://search.credoreference.eom/content/entry/hmrogets/typically/0 (Year: 2013).*

UK Combined Search and Examination Report, Application Ser. No. GB1409099.7, dated Jan. 21, 2015.

Elliot D. Kaplan, "Understanding GPS Principles and Applications", Mobile Communications Series, Sections 115.3.3-11.5.4, Figures 11.6-11.8.

James Bao-Yen Tsui, "Fundamentals of GPS Positioning Systems Receivers", Second Edition, Wiley Series in Microwave and Optical Engineering, Sections 5.15-5.16.

Robert Gagliardi, "Satellite Communication", Second Edition, pp. 557-562.

* cited by examiner

DETERMINING IONOSPHERIC TIME DELAYS FOR GLOBAL POSITIONING SYSTEM (GPS) RECEIVERS USING MULTIPLE CARRIER FREQUENCIES

FIELD

The present disclosure relates to atmospheric time delays. In particular, it relates to determining ionospheric time delays for global positioning system (GPS) receivers using multiple carrier frequencies.

BACKGROUND

As a global positioning system (GPS) signal travels from an on-orbit GPS space vehicle to the ground, various layers in the atmosphere will degrade the signal quality causing significant signal distortions and delays in the signal. These delays are translated and interpreted by the GPS signal users' receiver as position error.

The main regions of the atmosphere where the GPS signal time delays occur are the troposphere and the ionosphere. The ionosphere contains free ions, which cause time delays in signals. The ionosphere is the region of the atmosphere where the signal is delayed most severely, thereby causing the signal distortion. In particular, the ionosphere will cause a GPS signal code delay and a carrier phase advance.

In order to increase the accuracy of GPS signals, these errors need to be taken in consideration. Therefore, a system and method for determining ionospheric time delays for GPS receivers is needed.

SUMMARY

The present disclosure relates to a method, system, and apparatus for determining ionospheric time delays for global positioning system (GPS) receivers using multiple carrier frequencies. The disclosed method for determining atmospheric time delays involves receiving, with at least one antenna, at least two signals. In one or more embodiments, the signals each have a different carrier frequency. The method further involves amplifying each of the signals with a respective amplifier for each of the signals to produce amplified signals. Also, the method involves digitizing each of the amplified signals with a respective analog to digital converter (ADC) for each of the amplified signals to produce digital signals. In addition, the method involves correlating each of the digital signals with a code using a respective correlator for each of the digital signals to determine the time group delay differential between the signals. Further, the method involves calculating, with at least one processor, the time group delay coefficient of the signals by using the time group delay differential.

In one or more embodiments, the method further involves diplexing, with at least one diplexer, the signals. In at least one embodiment, the method further involves, prior to amplifying each of the signals, filtering each of the signals with a respective filter for each of the two signals. In some embodiments, the method further involves, after amplifying each of the signals, downconverting each of the amplified signals with a respective downconverter for each of the amplified signals.

In at least one embodiment, the method further involves converting, with at least one processor, the time group delay differential into a binary number. In some embodiments, the method further involves storing, into memory, the binary number.

In one or more embodiments, the method further involves transmitting, by at least one space vehicle, the signals. In some embodiments, the space vehicle a global positioning system (GPS) satellite.

In at least one embodiment, at least one antenna is associated with a receiver unit. In some embodiments, the receiver unit is terrestrial, marine, and/or airborne.

In one or more embodiments, a system for determining atmospheric time delays comprises at least one antenna to receive at least two signals. In at least one embodiment, the signals each have a different carrier frequency. The system further comprises a respective amplifier for each of the signals to amplify each of the signals to produce amplified signals. Also, the system comprises a respective analog to digital converter (ADC) for each of the amplified signals to digitize each of the amplified signals to produce digital signals. Additionally, the system comprises a respective correlator for each of the digital signals to correlate each of the digital signals with a code to determine the time group delay differential between the signals. Further, the system comprises at least one processor to calculate the time group delay coefficient of the signals by using the time group delay differential.

In at least one embodiment, the system further comprises at least one diplexer to diplex the signals. In some embodiments, the system further comprises a respective filter for each of the signals to filter each of the signals. In one or more embodiments, the system further comprises a respective downconverter for each of the amplified signals to downconvert each of the amplified signals.

In one or more embodiments, the at least one processor is further configured to convert the time group delay differential into a binary number. In some embodiments, the system further comprises memory to store the binary number.

In at least one embodiment, the system further comprises at least one space vehicle to transmit the signals. In some embodiments, the space vehicle is a global positioning system (GPS) satellite.

In one or more embodiments, at least one antenna is associated with a receiver unit. In some embodiments, the receiver unit is terrestrial, marine, and/or airborne.

The features, functions, and advantages can be achieved independently in various embodiments of the present embodiments or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for determining atmospheric time delays. Specifically, this system is used for determining ionospheric time delays for global positioning system (GPS) receivers using multiple carrier frequencies.

As previously mentioned above, as a GPS signal travels from an on-orbit GPS space vehicle to the ground, various layers in the atmosphere will degrade the signal quality causing significant signal distortions and delays in the signal. These delays are translated and interpreted by the GPS signal users' receiver as position error. The main regions of the atmosphere where the GPS signal time delays occur are the troposphere and the ionosphere. The ionosphere contains free ions, which cause time delays in signals. The ionosphere is the region of the atmosphere where the signal is delayed most severely, thereby causing the signal distortion. In particular, the ionosphere will cause a GPS signal code delay and a carrier phase advance.

Currently, in industry, GPS receivers make use of a single frequency (i.e. L1) to generate a single frequency ionospheric model to correct for the user root mean square (rms) position error caused by the ionospheric delays. The GPS navigation (NAV) signal structure is designed to store the ionospheric data in the NAV data stream. Specifically, the signal structure is designed to store the ionospheric data in sub-frame 4 of the NAV data stream. The receiver can make use of the single frequency ionospheric model to correct for the user root mean square (rms) position error. The present disclosure teaches an approach to correct for ionospheric delays by taking advantage of the adjacent L-Band GPS multi-carrier frequencies (i.e. L1, L2, and L5) to generate a multi-frequency ionospheric model. This approach can be implemented by using two carrier frequencies (e.g., any combination of two of the three frequencies L1, L2, and L5), or the approach can be extended to use all three carrier frequencies (i.e. L1, L2, and L5).

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
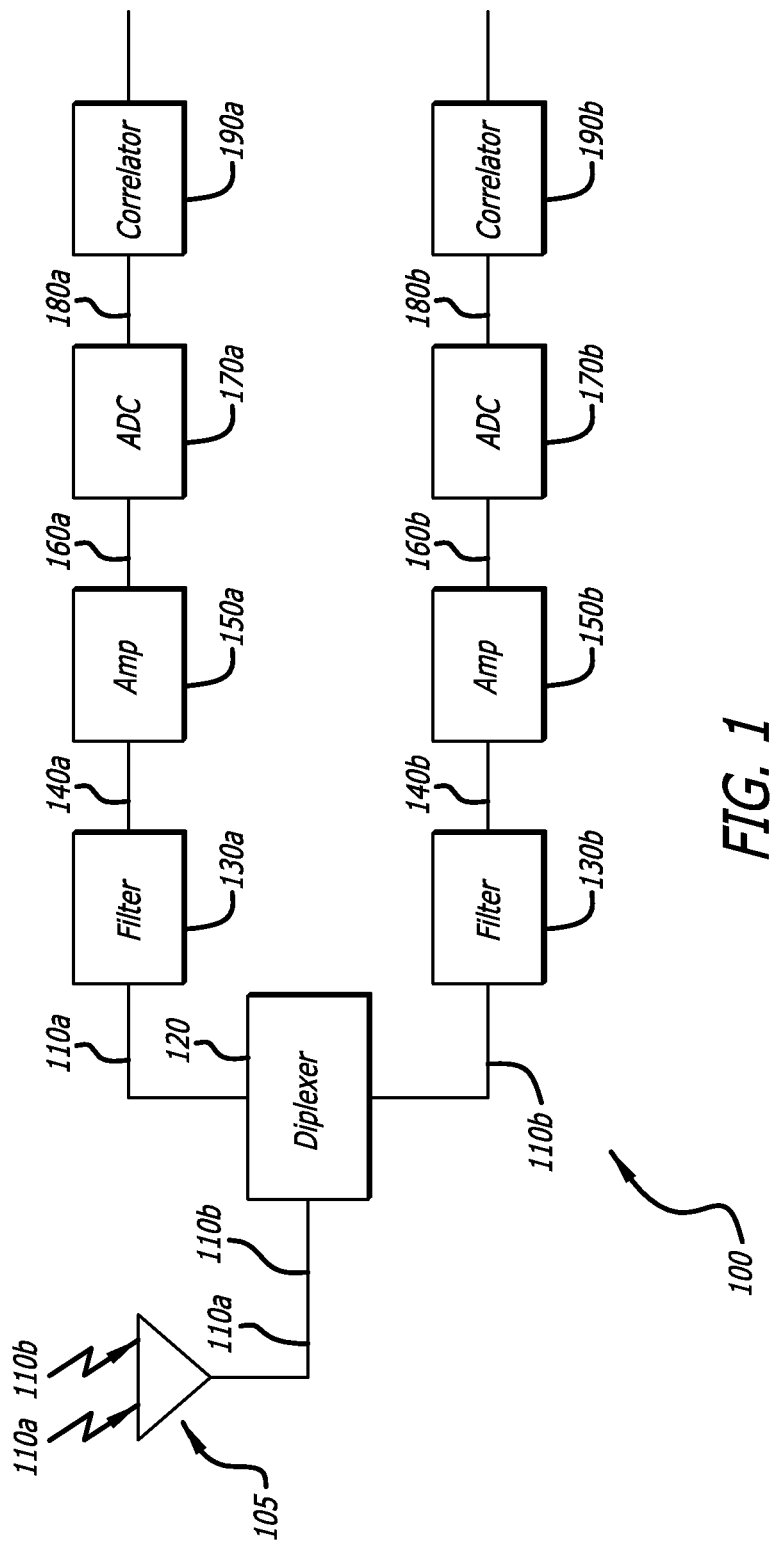
FIG. 1 is a schematic diagram of the system for determining ionospheric time delays for global positioning system (GPS) receivers using multiple carrier frequencies without using downconverters, in accordance with at least one embodiment of the present disclosure.

FIG. 1 is a schematic diagram of the system 100 for determining ionospheric time delays for global positioning system (GPS) receivers using multiple carrier frequencies without using downconverters, in accordance with at least one embodiment of the present disclosure. In this figure, an antenna 105, which is associated with a GPS receiver (not shown), is shown to be receiving two signals (e.g., an L1 signal and an L2 signal) 110a, 110b, which are transmitted from at least one GPS satellite (not shown). The two signals 110a, 110b are then diplexed (i.e. separated) by a diplexer 120, and travel independently through two parallel paths. Then, each of the two signals 110a, 110b are filtered (i.e. to provide noise band limiting) by a respective filter 130a, 130b to produce two filtered signals 140a, 140b. The two filtered signals 140a, 140b are then each amplified (i.e. to provide the desired gain) by a respective amplifier 150a, 150b to produce two amplified signals 160a, 160b.

Then, the two amplified signals 160a, 160b are then each digitized by a respective analog to digital converter (ADC) 170a, 170b to produce two digital signals 180a, 180b. The two digital signals 180a, 180b are then each correlated with a code (e.g., a GPS space vehicle (SV) identification (ID) pseudo-random number (PRN) code) by a respective correlator 190a, 190b (e.g., a hardware correlator and/or a software correlator) to determine the time group delay differential between the two signals 110a, 110b. Then, at least one processor (not shown) calculates the time group delay coefficient (Tgd) by using the time group delay differential. This particular calculation will be discussed in further detail below. The GPS receiver (not shown) then uses the time group delay coefficient (Tgd) to correct for the user root mean square (rms) position error.

It should be noted that in other embodiments for the disclosed system 100, more than two signals 110 may be received by one, or more than one, antenna 105. In addition, it should be noted that, in one or more embodiments for the disclosed system 100, each signal 110 received will have its own respective path comprising a filter 130, an amplifier 150, an ADC 170, and/or a correlator 190. Additionally, it should be noted that if more than one antenna 105 is employed by the disclosed system 100, in some embodiments, the system 100 may employ one or more diplexers 120 or may not employ any diplexers 120.

In addition, it should be noted that in other embodiments for the disclosed system 100, other space vehicles other than GPS satellites may be transmitting the signals 110. Additionally, it should be noted that in other embodiments, other receivers other than GPS receivers may be employed by the disclosed system 100 to receive the signals 110. Also, it should be noted that in some embodiments of the disclosed system 100, the receivers may be terrestrial, marine, and/or airborne.

Figure 2:
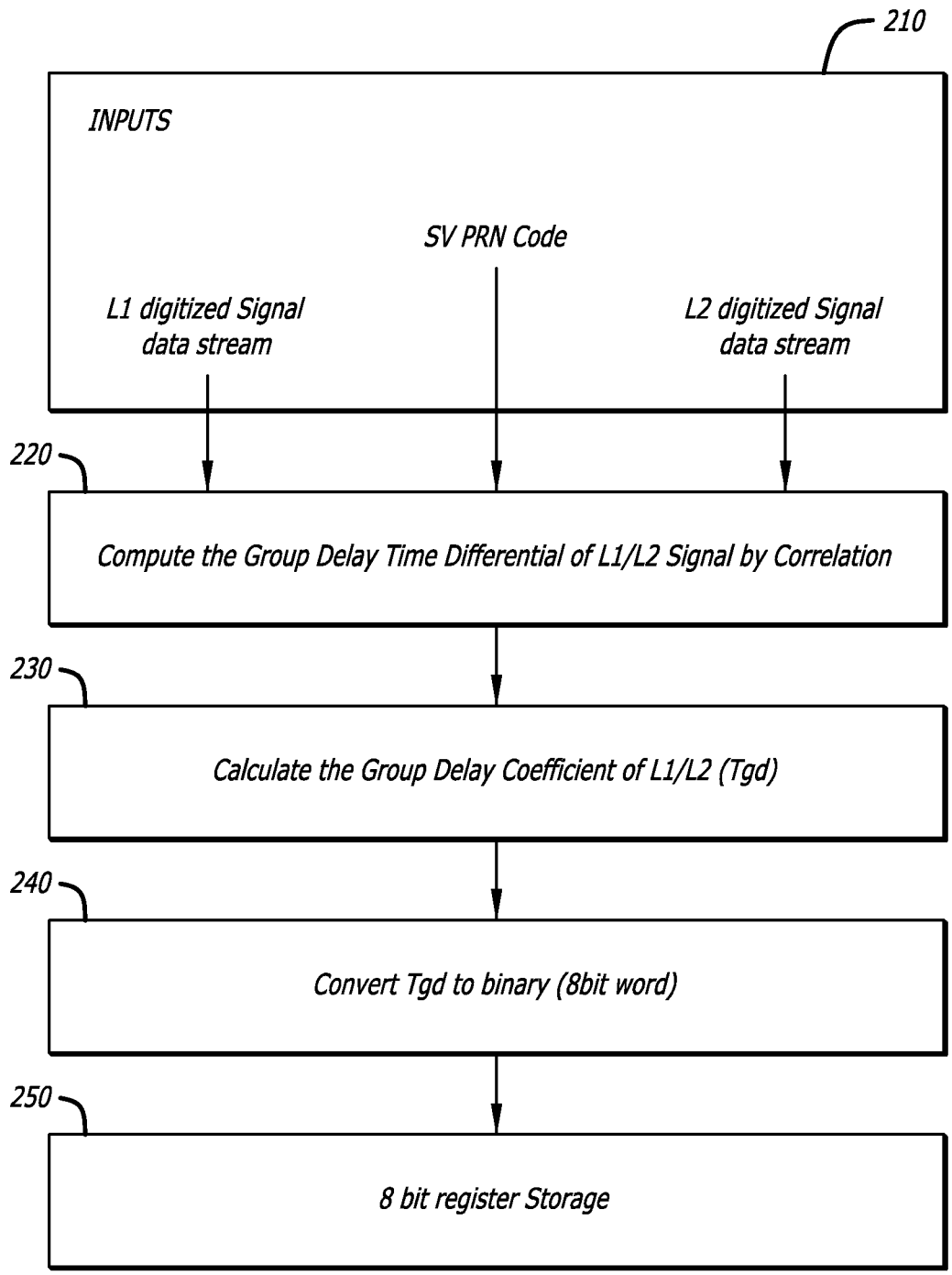
FIG. 2 is a flow diagram for determining the time group delay coefficient, in accordance with at least one embodiment of the present disclosure.

FIG. 2 is a flow diagram 200 for determining the time group delay coefficient (Tgd), in accordance with at least one embodiment of the present disclosure. In order to better understand the procedure described in this figure, a discussion regarding the terms and calculations contained in the figure is first presented.

One of the terms used for GPS signal correction is the term time group delay coefficient (Tgd). For example, the L1 time delay ($t_{L1P(Y)}$) and the L2 time delay ($t_{L2P(Y)}$) are initially calculated by the GPS control segment (CS) to account for the effect of the space vehicle (SV) time group delays based on measurements made during the manufacturing of the space vehicle. The time delay values can be independently uploaded to represent the on-orbit time group delays. The Tgd value is not equal to the differences in the SV time group delays alone, but is a measured value that accounts for ionospheric delays. The Tgd value represents the time group delay differential ($t_{L1P(Y)} - t_{L2P(Y)}$) multiplied by 1/(1-gamma), that is:

$$Tgd = \frac{1}{1-\gamma}(t_{L1P(Y)} - t_{L2P(Y)}) \qquad \text{Equation 1}$$

Where $t_{LiP(Y)}$ is the GPS $i^{th}$ frequency P(Y) signal (i.e. a specific epoch of the signal) that is transmitted from the SV antenna phase center, and gamma is the ratio of the frequencies in Hertz (Hz) squared $(f_{L1}/f_{L2})^2$. For example, for the L1 and L2 frequencies, gamma is $((77)/(60))^2$.

Referring back to FIG. 2, at the start of the procedure, the two digital signals for L1 and L2 180a, 180b as well as the GPS SV ID PRN code are provided 210. The time group delay differential is then calculated by correlating the two digital signals 180a, 180b with the GPS SV ID PRN code 220. Then, the time group delay coefficient (Tgd) is calculated by using the time group delay differential 230. After the time group delay coefficient (Tgd) is calculated, the time group delay coefficient (Tgd) is converted by at least one processor into a binary number (e.g., an 8-bit word) 240. Then, the binary number is stored into memory (e.g., an 8-bit register storage) 250. The binary number data can then be used by the receiver to correct for the user root mean square (rms) position error. It should be noted that, in some embodiments, the receiver can use this calculated ionospheric delay (i.e. this binary number data) in conjunction with the data contained in sub-frame 4 of the NAV data structure of the L1 signal to correct for the user root mean square (rms) position error.

Figure 3:
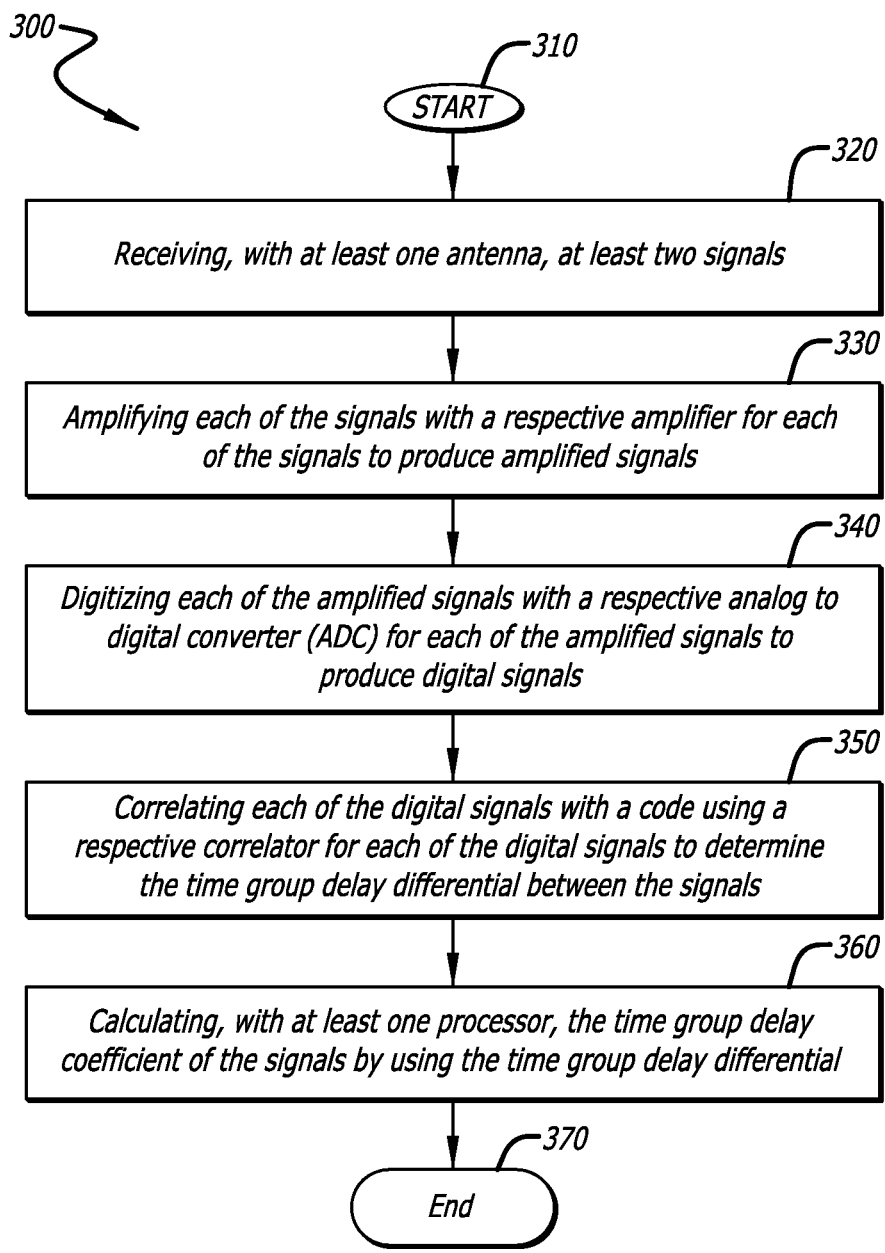
FIG. 3 is a flow diagram for the disclosed method for determining ionospheric time delays for global positioning system (GPS) receivers using multiple carrier frequencies without using downconverters for the system of FIG. 1, in accordance with at least one embodiment of the present disclosure.

FIG. 3 is a flow diagram 300 for the disclosed method for determining ionospheric time delays for global positioning system (GPS) receivers using multiple carrier frequencies without using downconverters for the system of FIG. 1, in accordance with at least one embodiment of the present disclosure. At the start 310 of the method 300, at least one antenna receives at least two signals 320. Then, each of the signals is amplified with a respective amplifier to produce amplified signals 330. The amplified signals are then each digitized with a respective analog to digital converter (ADC) to produce digital signals 340. Then, the digital signals are each correlated with a code by a respective correlator to determine the time group delay differential between the signals 350. At least one processor then calculates the time group delay coefficient by using the group delay differential 360. Then, the method 300 ends 370.

Figure 4:
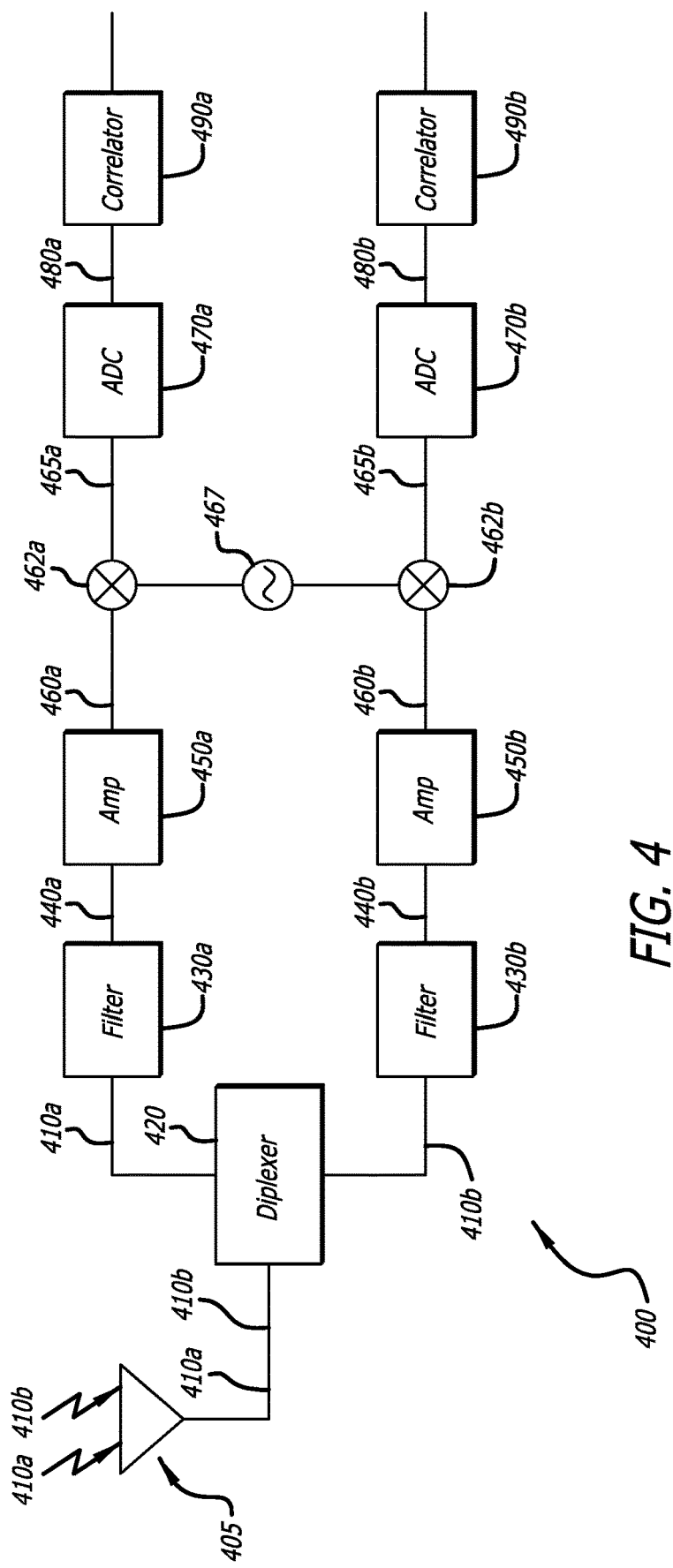
FIG. 4 is a schematic diagram of the system for determining ionospheric time delays for global positioning system (GPS) receivers using multiple carrier frequencies with using downconverters, in accordance with at least one embodiment of the present disclosure.

FIG. 4 is a schematic diagram of the system 400 for determining ionospheric time delays for global positioning system (GPS) receivers using multiple carrier frequencies with using downconverters 462a, 462b, in accordance with at least one embodiment of the present disclosure. In this figure, an antenna 405, which is associated with a GPS receiver (not shown), is shown to be receiving two signals (e.g., an L1 signal and an L2 signal) 410a, 410b, which are transmitted from at least one GPS satellite (not shown). The two signals 410a, 410b are then diplexed (i.e. separated) by a diplexer 420, and travel independently through two parallel paths. Then, each of the two signals 410a, 410b are filtered (i.e. to provide noise band limiting) by a respective filter 430a, 430b to produce two filtered signals 440a, 440b. The two filtered signals 440a, 440b are then each amplified (i.e. to provide the desired gain) by a respective amplifier 450a, 450b to produce two amplified signals 460a, 460b.

Then, the two amplified signals 460a, 460b are downconverted by a respective mixer (i.e. a respective downconverter) 462a, 462b to produce downconverted signals 465a, 465b. In this figure, the mixers 462a, 462b are shown to be both supplied by a shared oscillator 467. It should be noted that the use of mixers and oscillators by the system 400 may introduce some frequency distortion into the signals 460a, 460b. If possible, this frequency distortion should be taken into consideration.

Then, the two downconverted signals 465a, 465b are then each digitized by a respective analog to digital converter (ADC) 470a, 470b to produce two digital signals 480a, 480b. The two digital signals 480a, 480b are then each correlated with a code (e.g., a GPS space vehicle (SV) identification (ID) pseudo-random number (PRN) code) by a respective correlator 490a, 490b (e.g., a hardware correlator and/or a software correlator) to determine the time group delay differential between the two signals 410a, 410b. Then, at least one processor (not shown) calculates the time group delay coefficient (Tgd) by using the time group delay differential. The GPS receiver (not shown) then uses the time group delay coefficient (Tgd) to correct for the user root mean square (rms) position error.

Figure 5:
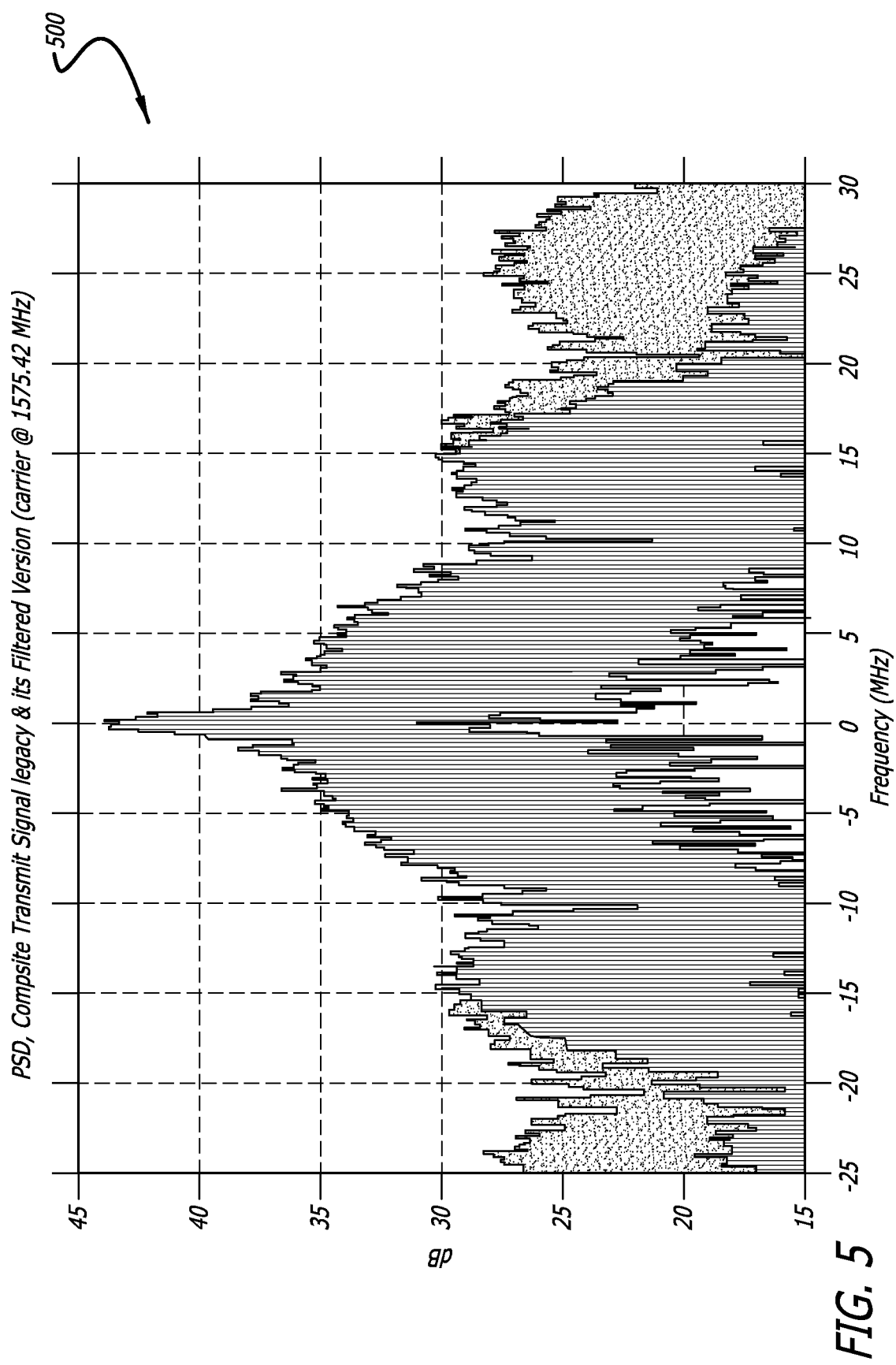
FIG. 5 is a graph depicting an exemplary L1 received signal spectra, in accordance with at least one embodiment of the present disclosure.
Figure 6:
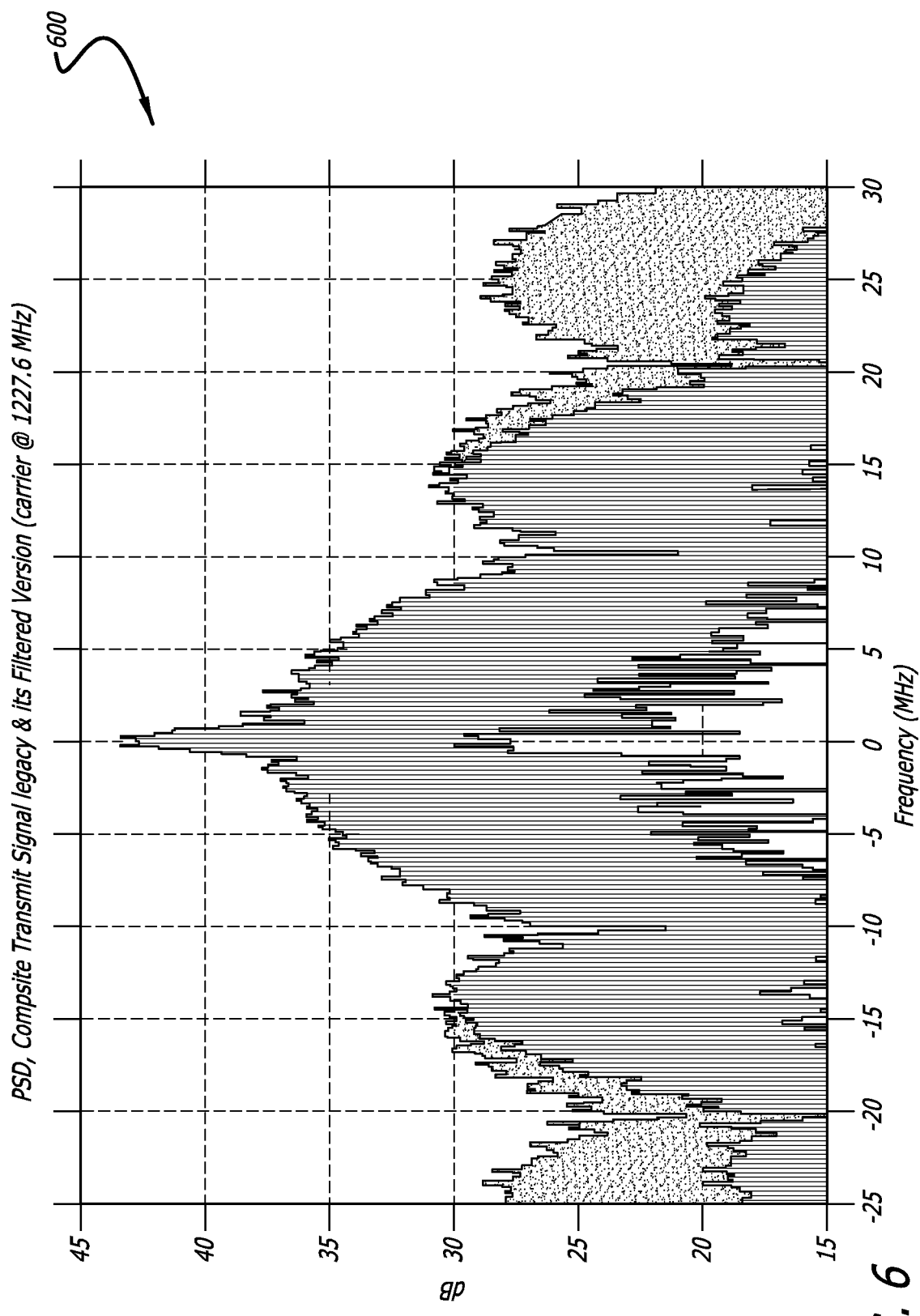
FIG. 6 is a graph showing an exemplary L2 received signal spectra, in accordance with at least one embodiment of the present disclosure.
Figure 7:
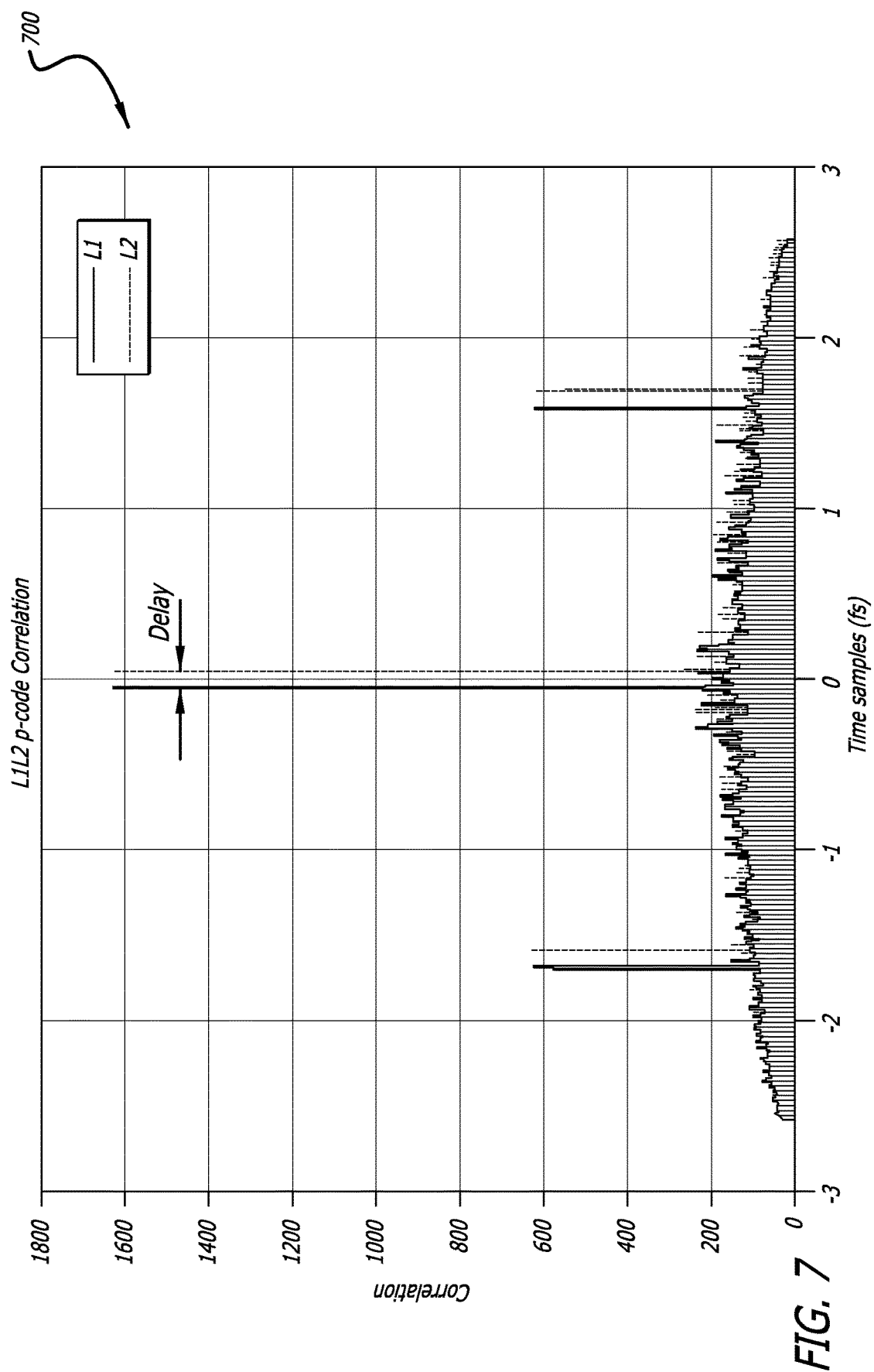
FIG. 7 is a graph illustrating the correlation of the exemplary L1 and L2 received signals to the space vehicle specific pseudo-random number (PRN) code, in accordance with at least one embodiment of the present disclosure.

FIG. 5 is a graph 500 depicting an exemplary L1 received signal spectra, in accordance with at least one embodiment of the present disclosure. FIG. 6 is a graph 600 showing an exemplary L2 received signal spectra, in accordance with at least one embodiment of the present disclosure. FIG. 7 is a graph 700 illustrating the correlation of the exemplary L1 and L2 received signals to the space vehicle specific pseudo-random number (PRN) code, in accordance with at least one embodiment of the present disclosure.

The disclosed method for determining ionospheric time delays for global positioning system (GPS) receivers using multiple carrier frequencies was simulated by using a MatLab model. The data contained in graphs 500, 600, and 700 are the results from this simulation. The results of the simulation (as shown in FIGS. 5, 6, and 7), with a hypothetical induced error, show a time group delay coefficient (Tgd) equal to a binary number of forty-eight (48), which converts to a time equivalent of 2.2352e-008 seconds. Since the instant error is approx one (1) meter per every nanosecond, the simulation shows an instant error of approximately twenty-two (22) meters, which can be corrected by a GPS receiver. Therefore, the simulation results show that the disclosed method employing a GPS receiver using two carrier frequencies, for example using L1 and L2, can determine a time delay for ionospheric correction of the GPS signal.

In one or more embodiments of the present disclosure, the ionospheric correction for the signal(s) is applied using the following formula:

$$PR = \frac{PR_{L2P(Y)} - \gamma PR_{L1P(Y)}}{1-\gamma} \qquad \text{Equation 2}$$

Where PR is the pseudorange corrected for ionospheric effects, and PRi is the pseudorange measured on the channel indicated by the subscript, and the coefficient gamma in this case is the clock correction factor, which is based on "two frequency" measurements and, therefore, accounts for the effects of the mean differential delay in the SV instrumentation.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for determining atmospheric time delays, the method comprising:
   receiving, with at least one antenna, at least two signals, wherein the at least two signals each have a different carrier frequency;
   filtering each of the at least two signals with a single respective noise band limiting filter for each of the at least two signals to produce at least two filtered signals;
   amplifying each of the at least two filtered signals with a single respective amplifier for each of the at least two filtered signals to produce at least two amplified signals;
   inputting each of the at least two amplified signals directly from each of the respective amplifiers into a respective analog to digital converter (ADC) for each of the at least two amplified signals;
   digitizing each of the at least two amplified signals with the respective ADC for each of the at least two amplified signals to produce at least two digital signals;
   correlating each of the at least two digital signals with a code using a separate respective correlator for each of the at least two digital signals to determine a time group delay differential between the at least two signals;
   calculating, with at least one processor, a time group delay coefficient of the at least two signals by using the time group delay differential; and
   wherein the method, comprising the receiving, the amplifying, the digitizing, and the correlating, is performed without using downconverters.

2. The method of claim 1, wherein the method further comprises diplexing, with at least one diplexer, the at least two signals.

3. The method of claim 1, wherein the method further comprises converting, with the at least one processor, the time group delay differential into a binary number.

4. The method of claim 3, wherein the method further comprises storing, into memory, the binary number.

5. The method of claim 1, wherein the method further comprises transmitting, by at least one space vehicle, the at least two signals.

6. The method of claim 5, wherein the space vehicle is a global positioning system (GPS) satellite.

7. The method of claim 1, wherein the at least one antenna is associated with a receiver unit.

8. The method of claim 7, wherein the receiver unit is one of terrestrial, marine, and airborne.

9. The method of claim 1, wherein the different carrier frequencies are at least two of an L1 frequency, L2 frequency, or L5 frequency.

10. The method of claim 1, wherein the code is a pseudo-random number (PRN) code.

11. The method of claim 10, wherein the PRN code is a global positioning system (GPS) space vehicle (SV) identification (ID) PRN code.

12. A system for determining atmospheric time delays, the system comprising:
    at least one antenna to receive at least two signals, wherein the at least two signals each have a different carrier frequency;
    a single respective noise band limiting filter for each of the at least two signals to filter each of the at least two signals to produce at least two filtered signals;
    a single respective amplifier for each of the at least two filtered signals to amplify each of the at least two filtered signals to produce at least two amplified signals;
    a respective analog to digital converter (ADC) for each of the at least two amplified signals to digitize each of the at least two amplified signals to produce at least two digital signals,
    wherein each of the respective amplifiers is directly connected to each of the respective ADCs;
    a separate respective correlator for each of the at least two digital signals to correlate each of the at least two digital signals with a code to determine a time group delay differential between the at least two signals; and
    at least one processor to calculate a time group delay coefficient of the at least two signals by using the time group delay differential,
    wherein the system, comprising the at least one antenna, the amplifiers, the analog to digital converters, the correlators, and the at least one processor, is without downconverters.

13. The system of claim 12, wherein the system further comprises at least one diplexer to diplex the at least two signals.

14. The system of claim 12, wherein the at least one processor is further configured to convert the time group delay differential into a binary number.

15. The system of claim 14, wherein the system further comprises memory to store the binary number.

16. The system of claim 12, wherein the system further comprises at least one space vehicle to transmit the at least two signals.

17. The system of claim 16, wherein the space vehicle is a global positioning system (GPS) satellite.

18. The system of claim 12, wherein the at least one antenna is associated with a receiver unit.

19. The system of claim 18, wherein the receiver unit is one of terrestrial, marine, and airborne.

20. The system of claim 12, wherein the different carrier frequencies are at least two of an L1 frequency, L2 frequency, or L5 frequency.

* * * * *